United States Patent [19]

Falls

[11] Patent Number: 4,733,727
[45] Date of Patent: Mar. 29, 1988

[54] OIL RECOVERY WITH WATER CONTAINING CARBONATE SALT, CO2, AND SURFACTANT

[75] Inventor: Andrew H. Falls, Sugarland, Tex.

[73] Assignee: Shell Oil Company, Houston, Tex.

[21] Appl. No.: 928,212

[22] Filed: Nov. 7, 1986

[51] Int. Cl.⁴ .............................................. E21B 43/22
[52] U.S. Cl. ...................................... 166/273; 166/275; 252/8.554
[58] Field of Search ....................... 166/273, 274, 275; 252/8.554

[56] References Cited

U.S. PATENT DOCUMENTS

| | | | |
|---|---|---|---|
| 3,414,053 | 12/1968 | Treiber et al. ...................... | 166/273 |
| 3,469,630 | 9/1969 | Hurd et al. ...................... | 166/273 X |
| 3,498,379 | 3/1970 | Murphy .......................... | 166/273 X |
| 4,044,831 | 8/1977 | Allen ............................ | 252/8.554 X |
| 4,058,467 | 11/1977 | Sias ............................. | 252/8.554 |
| 4,441,555 | 4/1984 | Shu ............................. | 166/273 X |
| 4,493,371 | 1/1985 | Reisberg et al. .................. | 166/274 |
| 4,502,538 | 3/1985 | Wellington et al. ............. | 166/273 X |
| 4,610,304 | 9/1986 | Doscher ......................... | 166/273 X |

Primary Examiner—George A. Suchfield

[57] ABSTRACT

In displacing oil by injecting $CO_2$, water and surfactant at high pressure, surfactant loss by adsorption is reduced by including alkali metal carbonate or bicarbonate salt in the injected water to increase the pH of the solution at the conditions encountered in the reservoir.

9 Claims, 2 Drawing Figures

OIL RECOVERY WITH WATER CONTAINING CARBONATE SALT, CO2, AND SURFACTANT

RELEVANT APPLICATION

The Assignee's co-pending application Ser. No. 928,123, "Oil Recovery with Water Containing Carbonate Salt and CO₂," which lists as the inventors A. H. Falls and M. I. Kuhlman, is relevant to this application.

BACKGROUND OF THE INVENTION

This invention relates to a fluid drive oil recovery process in which $CO_2$, water and surfactant are injected into an oil reservoir to displace the oil. More particularly, the invention relates to a method for reducing the extent to which surfactant is lost due to its adsorption on the reservoir rocks.

In some respects, the present invention is an improvement on the process described in U.S. Pat. No. 4,502,538 by S. L. Wellington, J. Reisberg, E. F. Lutz and D. B. Bright. In that process, oil is displaced within a subterranean reservoir by injecting a combination of substantially liquefied $CO_2$, brine and a polyalkoxy aliphatic surfactant material. The disclosures of that patent are incorporated herein by reference.

The present invention also improves processes of the type described in U.S. Pat. No. 3,529,668. The latter relates to an oil recovery process in which a bank of foam is established by an injection of a foaming surfactant, an aqueous liquid and a gas such as $CO_2$.

SUMMARY OF THE INVENTION

The present invention relates to an improvement in an oil recovery process in which $CO_2$, aqueous solution and an anionic surfactant are injected into a subterranean reservoir to displace oil, with the injection pressure and rate of fluid production arranged so that the $CO_2$ is pressurized to at least more than the reservoir fluid pressure. The improvement relates to reducing the extent to which the surfactant is absorbed on the reservoir rocks. This is effected by including within the aqueous phase of the injected fluid an amount of monovalent cationic salt of carbonic acid effective for increasing the pH of the solution, at the conditions encountered within the reservoir, to an extent which reduces the level of adsorption of the surfactant.

In the present process the $CO_2$ is preferably pressurized to a point of significant interaction with the oil, such as the point where either (1) it becomes substantially miscible with the reservoir oil or (2) enough mass transfer occurs between the injected $CO_2$ and the reservoir oil that (a) the viscosity of the reservoir oil is lowered and/or (b) the reservoir oil swells and/or (c) the $CO_2$ is able to extract components from the reservoir oil.

DESCRIPTION OF THE INVENTION

Figure 1:
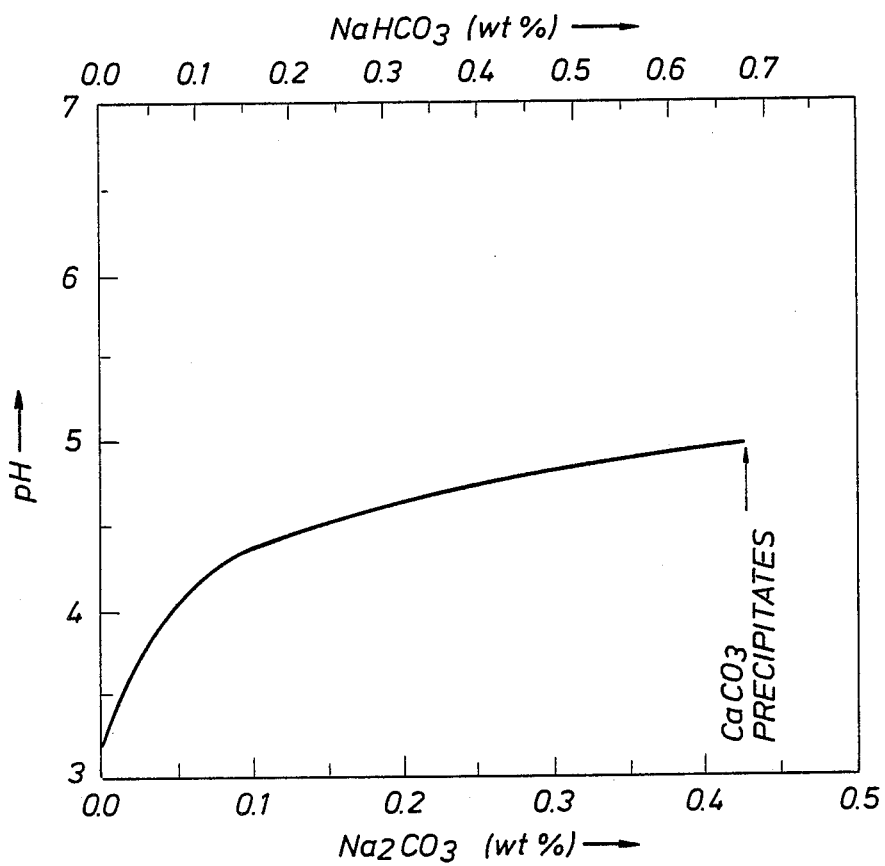
FIG. 1 shows a plot of aqueous liquid solution pH with increasing amounts of sodium bicarbonate or sodium carbonate at 170° F. and 2500 psig.

Dilute aqueous solutions of anionic sulfonate surfactant, such as Enordet ® alcohol ethoxy glycerol sulfonates (AEGS), supplied by Shell Chemical Company, NEGS, ethoxyglyceryl sulfonates synthesized by Shell Development Company from NEODOL ® alcohol ethoxylates supplied by Shell Chemical Company, and other alcohol ethoxylates, and NES alcohol ethoxy sulfonates, available from Diamond Shamrock Company, may be capable of preventing $CO_2$ from overriding other phases during a $CO_2$ oil recovery process in nearly horizontal Gulf Coast sandstones. Because the mobility of $CO_2$ in the absence of surfactant is high, it is desirable that the surfactant front remain ahead of the $CO_2$ front.

One way of keeping the surfactant front ahead of the $CO_2$ front is to inject a large preslug of surfactant solution followed by alternate slugs of $CO_2$ and surfactant solution. This approach has the advantage that the surfactant in the preslug is transported through the reservoir at neutral pH. When $CO_2$ is introduced, however, the pH drops due to the increase in the concentration of carbonic acid in the solution. The pH reduction causes the surfactant concentration to be diminished as the pH approaches or falls below the point of zero charge of the reservoir rock materials, such as silica and clay, and increases the adsorption onto the rocks. Thus, the preslug design succeeds only if the concentration of surfactant in the brine behind the $CO_2$ front is sufficient to control $CO_2$ mobility.

The preslug design also has other drawbacks. The size of the slug needed to ensure that surfactant stays ahead of $CO_2$ throughout the reservoir is large. As such, the economics of the process suffer because several years elapse before the oil displacing agent ($CO_2$) is even introduced. Moreover, there is the risk that $CO_2$ may not invade the same volume as the surfactant solution before it.

A much more attractive way of keeping the surfactant front ahead of the $CO_2$ front is to alternately inject surfactant solution and $CO_2$ from the start. In this way, oil can be produced earlier in the life of the project. In prior processes, this caused the surfactant to be transported at relatively low pH. However, the adsorption losses for $CO_2$-foam-forming NEGS, NES or Enordet ® 2000 series surfactants at low pH (e.g. on the order of 3) are larger than at neutral pH. For example, the adsorption of 0.05 wt% NEGS 9-2.6 sulfonate based on $C_9$ alcohol from 70% D-sand water of pH 6.8 at 170° F. onto a relatively clean, Ottawa sand is about 0.069 $lb_m$ surfactant per barrel of pore space and onto Ottawa sand containing 2 wt% Silver Hill illite is about 0.13 $lb_m$ surfactant per barrel of pore space. In the presence of $CO_2$ at 170° F., 2600 psig, these adsorptions rise to 0.098 and 0.22 $lb_m$ surfactant per barrel of pore space, respectively.

The reactions that take place in an aqueous solution in equilibrium with $CO_2$ are complex. When a carbonate solution contains divalent cations, solid phases may form. Whether solids precipitate can be determined by comparing the solubility products of the various minerals with the products of the aqueous phase concentrations of the appropriate ions; the least soluble of these is calcium carbonate. When equations for the equilibrium constants for reactions between the various ionic species are combined with a charge balance and stoichiometric relationships, they yield a cubic equation for the concentration of hydrogen ions in solution. For example, $$[H^+]^3 + 2\{[Na_2CO_3] + [NaHCO_3]\}[H^+]^2 -$$

-continued $$\{K_w + K_1[H_2CO_3(app)]\}[H^+] - 2K_1K_2[H_2CO_3(app)] = 0$$

when the carbonate salt is $Na_2CO_3$, $NaHCO_3$, or a mixture of $Na_2CO_3$ and $NaHCO_3$. The solution to such an equation can be found, either analytically or by simply evaluating the polynomial as a function of $[H^+]$ to determine the pH at which it changes sign. The ions from the salts in the brine do not appear in this equation because their contributions cancel one another. The brine does play a role, however, as it affects the activities of the solutes and the apparent concentration of carbonic acid.

The values of the equilibrium constants and apparent concentration of carbonic acid used in finding solutions to the above equation are recorded in Table 1. The brine was modeled as 30% synthetic D-sand water (DSW) because it has nearly the same salinity as seawater (see Table 2), for which the appropriate equilibrium constants have been measured and correlated. These correlations are applied directly to 30% DSW to produce the values shown in Table 1. Although 30% DSW has less total dissolved solids than water available for $CO_2$ field projects in Gulf Coast sands, the calculation presented here should qualitatively reflect aqueous carbonate equilibria in more concentrated brines.

TABLE 1

Consistent with Molal Units, Values of the Equilibrium Constants and Apparent Concentration of Carbonic Acid used to Determine the pH of Carbonated, 30% D-sand Water to which $Na_2CO_3$ or $NaHCO_3$ is added

| Quantity | Value @ 170° F. 2500 psig | Value @ 77° F. 14.7 psig |
|---|---|---|
| $-\log K_w$ | 11.9 | 13.2 |
| $-\log K_1$ | 6.0 | 5.95 |
| $-\log K_2$ | 8.51 | 9.04 |
| $-\log K_{sp}^{CaCO_3}$ | 6.57 | 6.19 |
| $[H_2CO_3(app)]$ | 0.865 | 0.012 |

TABLE 2

Comparison of Concentrations of Major Inorganic Species in Seawater and in 30% Synthetic D-sand Water

| Species | Concentration in 30% Synthetic DSW (ppm) | Concentration in Seawater (ppm) |
|---|---|---|
| $Cl^-$ | 21,900 | 19,000 |
| $Na^+$ | 12,900 | 10,600 |
| $Ca^{2+}$ | 500 | 400 |
| $Mg^{2+}$ | 390 | 1,300 |

FIG. 1 displays the pH of a solution of 30% D-sand water in equilibrium with a free $CO_2$ phase (or $CO_2$-rich phase) at 170° F., 2500 psig as a function of $Na_2CO_3$ or $NaHCO_3$ content. This is representative of such a solution under reservoir conditions as a function of the amount of $Na_2CO_3$ or $NaHCO_3$ added. The pH rises quickly when $Na_2CO_3$ is included. This is because $Na^+$ is being substituted for $H^+$ in satisfying the charge balance. Whether $Na_2CO_3$ or $NaHCO_3$ is incorporated, however, makes little difference on the pH of the system: it is the equivalents of $Na^+$ that counts. Thus, the ratio of $NaHCO_3$ to $Na_2CO_3$ needed to achieve a given pH is equal to twice the ratio of the molecular weights.

There is one difference between $Na_2CO_3$ and $NaHCO_3$. The solution takes up $CO_2$ to maintain equilibrium with the free $CO_2$ phase when $Na_2CO_3$ is added. By contrast, $CO_2$ evolves from the solution when $NaHCO_3$ is used. In either case, the amount of $CO_2$ is small, corresponding to less than 5 SCF/bbl of solution for the concentration range depicted in FIG. 1.

For this example, the solubility product of $CaCO_3$ is exceeded when the concentrations of $Na_2CO_3$ and $NaHCO_3$ reach approximately 0.42 wt% and 0.67 wt%, respectively. To keep $CaCO_3$ from precipitating, the concentrations of the additives must be below these values. The amounts that can be added decrease as the hardness increases.

The equilibrium state differs greatly at surface conditions, e.g., 77° F. and low pressure. In particular, calcium carbonate precipitates from the solution at lower levels of $Na_2CO_3$ or $NaHCO_3$.

If a free $CO_2$ phase is not present, as would ordinarily be the case in surface facilities, $CaCO_3$ drops out of the 30% DSW solution, at a pH slightly below 9, when only 0.0012 wt% $Na_2CO_3$ has been added. The case of adding $NaHCO_3$ is somewhat better: 0.0168 wt% can be incorporated before $CaCO_3$ precipitates (solution pH of 7.5). Nevertheless, neither of these chemicals can be added in quantities sufficient to raise the solution pH appreciably under reservoir conditions, as indicated in FIG. 1.

Figure 2:
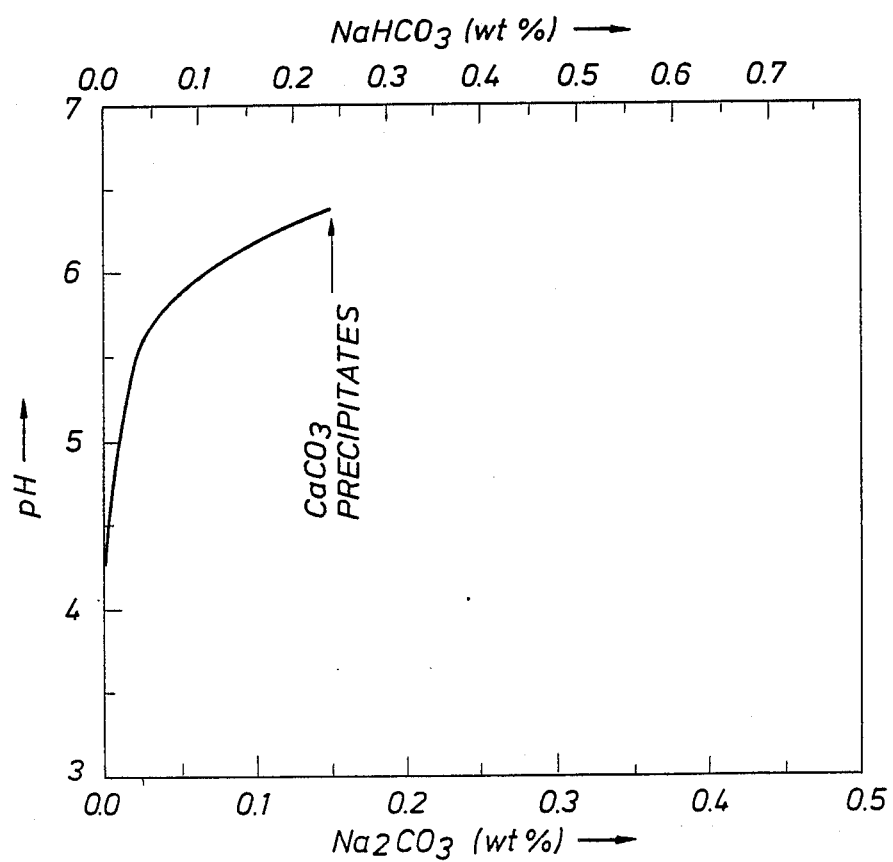
FIG. 2 shows a similar plot at 77° F. and 14.7 psia.

A way to keep calcium carbonate from precipitating in surface facilities is to store the solution under a blanket of $CO_2$. The partial pressure of the $CO_2$ can be relatively low. FIG. 2 displays the calculation of solution pH as a function of the $Na_2CO_3$ or $NaHCO_3$ content when the partial pressure of $CO_2$ is one atmosphere. 0.15 wt% $Na_2CO_3$ or 0.24 wt% $NaHCO_3$ can be added to the brine before $CaCO_3$ drops out. (Even more $Na_2CO_3$ or $NaHCO_3$ can be included if the partial pressure of $CO_2$ is higher.) These amounts give a pH of about 4.5 under reservoir conditions (see FIG. 1).

Because the surfaces of reservoir sands become less negatively charged as pH is lowered, raising the pH of a foam formulation from 3 to 4.5 should substantially reduce the adsorption of anionic, $CO_2$-foam-forming surfactants. In fact, this has been found experimentally to be the case. With only 0.15 wt% $Na_2CO_3$ included in the aqueous solution, the adsorption of 0.05 wt% NEGS 9-2.6 NRE in 70% D-sand water in equilibrium with $CO_2$ at 170° F. and 2600 psi was found to be 0.073 $lb_m$ surfactant per barrel of pore space on relatively clean Ottawa sand and 0.17 $lb_m$ surfactant per barrel of pore space on Ottawa sand containing 2 wt% Silver Hill illite.

In a preferred procedure for conducting the present invention, fluid is circulated between injection and production locations within the reservoir at a rate providing both a relatively high pressure at which the $CO_2$ is pressurized to a point of significant interaction with the reservoir oil and a suitable rate of flow, with the mobility of the injected fluid at least substantially equalling that of the water or brine in the reservoir. Then, while maintaining substantially the same rate of circulation, portions of $CO_2$, at least one relatively water-soluble anionic surfactant and portions of an aqueous solution containing an effective amount of an alkali metal salt of carbonic acid and aqueous liquid having physical and chemical properties at least substantially equivalent to those of the aqueous liquid in the reservoir, are included within the inflowing fluid. The included amount of alkali metal salt is an amount effective for increasing the pH of the solution in contact with the pressurized $CO_2$ at the conditions within the reservoir to an extent reducing the level of adsorption of the surfactant on the reservoir rocks. That injection is continued until the volume of injected fluid is sufficient to form a bank large enough to be capable of remaining substantially intact throughout a displacement from the injection to the production location within the reservoir. Then, a circulation of fluid comprising said injected fluid or a drive fluid effective for displacing said injected fluid, between the injection and production locations, is continued to displace oil into the production location.

The surfactant used in the present process can consist essentially of at least one water-soluble anionic surfactant, such as a polyalkoxy sulfonate surfactant which surfactant is capable of reducing the mobility of the $CO_2$ and aqueous solution in contact with the reservoir oil (or a substantially equivalent oil). The surfactant preferably has the formula $$RO(R'O)_xR''SO_3M$$

where: R is an aliphatic or aliphatic-aromatic hydrocarbon radical containing from about 6 to 25 carbon atoms connected to an oxygen atom. R' is an ethylene radical or a predominantly ethylenic mixture of ethylene and propylene radicals that are each connected between oxygen atoms, x is a number at least equalling 1; R'' is a saturated aliphatic $C_2$ or $C_3$ hydrocarbon radical or $CH_2CHOHCH_2$ radical connected between an oxygen and a sulfur atom; and M is an alkali metal or ammonium ion.

The saline aqueous solution (or water or brine) which is used in the present process can be substantially any which can be flowed through the reservoir to be treated without significant change due to dilution and/or increases in salinity due to diffusion and/or ion-exchange effects within the reservoir. Such a brine is preferably the brine produced from the reservoir to be treated or produced from a nearby reservoir. When the reservoir has been waterflooded with a brine less saline than the reservoir brine, the brine used in the present process preferably has a salinity which is substantially equivalent in the effective ratio of monovalent to multivalent cations relative to the brine used in the waterflood after it reached a state of equilibrium with the rocks in the reservoir.

A drive fluid used for displacing a bank or slug of fluid containing the dispersion of $CO_2$ in aqueous surfactant solution (as injected or formed within the reservoir by the injected substantially liquefied $CO_2$, brine and surfactant) through a reservoir can be substantially any drive fluid which is capable of displacing such a mixture within a reservoir formation. Particularly suitable fluids comprise aqueous liquids and/or mixtures of aqueous liquids and gas having mobilities at least substantially as low as that of said bank of fluid. Suitable fluids can comprise water, brine, carbonated water, flue gas, nitrogen, etc.

The monovalent cationic salt of carbonic acid which is used in the present process can comprise substantially any alkali metal or ammonium salt. Sodium carbonate, sodium bicarbonate, or mixtures of them, are particularly preferred for such use.

What is claimed is:

1. In an oil recovery process in which $CO_2$, aqueous liquid and a preferentially water-soluble, anionic surfactant are injected into a subterranean reservoir to displace oil toward a production location at an injection pressure and rate of fluid production such that the $CO_2$ is pressurized to at least more than the fluid pressure in the reservoir, an improvement for reducing the extent to which the surfactant is absorbed on the reservoir rocks, comprising:
   including within the aqueous phase of said injected fluid an amount of monovalent cationic carbonic acid salt which is effective for increasing the pH of the solution at the conditions within the reservoir to an extent which reduces the level of the adsorption of the surfactant.

2. The process of claim 1 in which the monovalent cationic salt is an alkali metal salt.

3. The process of claim 1 in which the aqueous liquid is a liquid produced from the reservoir being treated.

4. The process of claim 1 in which the monovalent cationic salt is sodium bicarbonate.

5. The process of claim 1 in which the monovalent cationic salt is sodium carbonate.

6. The process of claim 1 in which oil is recovered by initially circulating fluid between injection and production locations in the reservoir at injection and production rates capable of pressurizing $CO_2$ to a pressure sufficient for causing significant interaction between the $CO_2$ and the reservoir oil; and
   while maintaining substantially the same rate of injection and production, injecting said $CO_2$ anionic surfactant and aqueous liquid in which the effective amount of monovalent cationic carbonic acid salt is dissolved;
   continuing the injection of said fluid until the volume is at least sufficient to form a bank large enough to remain substantially intact throughout its displacement from an injection to a production location in the reservoir; and
   injecting drive fluid to effect a displacement of oil into the production location.

7. The process of claim 1 in which the monovalent cationic salt is a mixture of sodium carbonate and sodium bicarbonate.

8. The process of claim 7 in which the monovalent cationic salt is trona ore.

9. In an oil recovery process in which $CO_2$, aqueous liquid, and a preferentially water soluble, anionic surfactant are injected into a subterranean reservoir to displace oil toward a production location at an injection pressure and rate of fluid production such that the $CO_2$ is pressurized to at least more than the fluid pressure in the reservoir, an improvement for reducing the extent to which the surfactant is absorbed on the reservoir rocks, comprising:
   including within the aqueous phase of said injected fluid an amount of sodium bicarbonate which is effective for increasing the pH of the solution at the conditions within the reservoir to an extent which reduces the level of the absorption of the surfactant.

* * * * *